US012472520B2

(12) United States Patent
Knight

(10) Patent No.: US 12,472,520 B2
(45) Date of Patent: Nov. 18, 2025

(54) CONTINUOUS SPRAY TRIGGER DISPENSER

(71) Applicant: RIEKE PACKAGING SYSTEMS LIMITED, Leicester (GB)

(72) Inventor: Simon Christopher Knight, Bridgend Mid Glamorgan (GB)

(73) Assignee: RIEKE PACKAGING SYSTEMS LIMITED, Leicestershire (GB)

( * ) Notice: Subject to any disclaimer, the term of this patent is extended or adjusted under 35 U.S.C. 154(b) by 778 days.

(21) Appl. No.: 17/780,191

(22) PCT Filed: Nov. 27, 2020

(86) PCT No.: PCT/EP2020/083637
§ 371 (c)(1),
(2) Date: May 26, 2022

(87) PCT Pub. No.: WO2021/105367
PCT Pub. Date: Jun. 3, 2021

(65) Prior Publication Data

US 2022/0410193 A1 Dec. 29, 2022

Related U.S. Application Data

(60) Provisional application No. 62/941,005, filed on Nov. 27, 2019.

(51) Int. Cl.
*B05B 11/00* (2023.01)
*B05B 11/10* (2023.01)

(52) U.S. Cl.
CPC .................................. *B05B 11/1011* (2023.01)

(58) Field of Classification Search
CPC ............. B05B 11/1011; B05B 11/1067; B05B 11/1074; B05B 11/1077; B05B 11/1038; B05B 11/104; B05B 1/3421; B05B 11/0008; B05B 11/0044
See application file for complete search history.

(56) References Cited

U.S. PATENT DOCUMENTS 3,726,442 A * 4/1973 Davidson .............. B05B 11/103 222/481.5
4,155,487 A * 5/1979 Blake .................. B05B 11/1011 222/207
4,222,501 A 9/1980 Hammett et al.
(Continued)

FOREIGN PATENT DOCUMENTS

EP 0262484 A2 4/1988
JP 2018069186 A 5/2018
WO 2018049373 A1 3/2018

OTHER PUBLICATIONS

International Search Report mailed Feb. 22, 2022; International Patent Application No. PCT/EP2020/083637 filed Nov. 27, 2020. ISA/EP.

*Primary Examiner* — Vishal Pancholi
(74) *Attorney, Agent, or Firm* — McDonald Hopkins LLC

(57) ABSTRACT

An all-plastic, continuous trigger sprayer is contemplated that avoids the use of metal parts, elastomers, or other disparate and non-recyclable materials. A reservoir diaphragm is provided within the sprayer head, interposed between the actuation mechanism and the outlet, so as to ensure a steady flow of dispensed fluid is delivered even after actuation has ceased.

19 Claims, 10 Drawing Sheets

(56) References Cited

U.S. PATENT DOCUMENTS

| | | | |
|---|---|---|---|
| 4,241,853 | A | 12/1980 | Blake et al. |
| 2008/0230563 | A1 | 9/2008 | Maas et al. |
| 2017/0209883 | A1 | 7/2017 | Tada et al. |
| 2021/0146389 | A1 | 5/2021 | Knight et al. |

* cited by examiner

CONTINUOUS SPRAY TRIGGER DISPENSER

RELATED APPLICATIONS AND TECHNICAL FIELD

This application is a 35 U.S.C. 371 national stage of PCT Application No. PCT/EP2020/083637 filed Nov. 27, 2020, entitled "CONTINUOUS SPRAY TRIGGER DISPENSER," which claims priority to U.S. Provisional Patent Application Ser. No. 62/941,005, filed on Nov. 27, 2019. Each of which are incorporated by reference in their entireties.

This application relates generally to trigger-activated pump dispensers and, more specifically, to a pump, including a bellows reservoir made from recyclable materials (e.g., a single grade of plastic or a set of plastics that are compatible with and amenable to recycling procedures), configured to dispense an extended stream or spray without continuous actuation after the pump engine has been properly primed.

BACKGROUND

At present, a class of pump dispensers can be made from post-consumer resin (PCR) ranging from 67% to 100%, in terms of PCR recycled content. As consumers and manufacturers continue to support sustainability initiatives, the demand for these types of dispensers is expected to grow. Correspondingly, dispensers made from a single grade of polymeric material, without reliance on any metallic or glass components, are particularly desirable insofar as they themselves can be converted into PCR base material without the need for disassembly or separation of plastic from non-plastics components.

Over the years there have been many proposals for avoiding the use of metal in pumps. Deformable pump chambers, typically using a single bellows constructions and elastomer or thermoplastic elastomer materials, have been proposed and used. However these materials are expensive as well as usually non-recyclable, while bellows-form chambers are seldom effective.

U.S. Pat. No. 4,867,347 describes a pump chamber having a resiliently restorable flexible wall which could be made from standard plastics such as polypropylene. Restoring force is provided by a special form of the flexible wall, comprising at least one facet having a concave boundary and a curved surface portion interrupting the facet to induce bending thereof in the dispensing stroke, this bending producing a strong restoring force tending to restore the flexible wall to the rest condition. The curved surface portion—typically a cylindrical surface portion—is axially inclined to the facet and meets it along the concave boundary. In the preferred form the flexible wall has the shape of a polygonal pyramid with plural facets. While this structure can be molded integrally with adjacent components, the restoring force achieved was inconsistent and sometimes inadequate so that the design was never adopted in widespread commercial uses.

Trigger sprayers are a class of dispensers in which a directional nozzle dispenses fluid along a known and expected flowpath. Such dispensers usually rely on atomization to evenly disperse the fluid and/or to create a mist therefrom. Consumers often prefer these types of dispensers for cleaning and personal care products precisely because of this predictable, projecting dispensing pattern. The trigger sprayer assembly itself is characterized by a closure that couples to a container, with a handle or trigger-type actuator positioned beneath the barrel of a horizontal projecting outlet. The outlet may include a rotatable nozzle assembly to open, close, and/or toggle between various types of spray patterns (mist, stream, wide cone, narrow cone, etc.). The position of the outlet is generally fixed relative to the container and closure. One such trigger is described in international patent publication number WO 2018/049373, filed on Sep. 12, 2017.

However, in trigger dispensers, it is also desirable to employ a "pre-compression" arrangement so that fluid is forcefully and completely dispensed upon the first actuation of the trigger (after an initial priming, when the dispenser is used for the very first time). In this manner, pre-compression reinforces and further ensures that the dispensing path will be consistent and known (i.e., without an initial stroke whereby the fluid fails to fully project and/or disperse as designed and intended).

Another desirable trait in some sprayers relates to the ability to deliver a steady, continuous stream/spray without continuous/repeated actuation. These "continuous spray" dispensers allow the user to actuate and prime the pumping mechanism (via the trigger), and then cease/release the actuation while the stream/spray is dispensed.

United States patent publication 2008/0230563 discloses a pre-compression style trigger sprayer. A pre-compression valve is employed to create predetermined pressure prior to actuation. The valve itself is an elastic diaphragm, while flexion springs are used to urge the actuator and piston into position.

International patent publication WO 2019/200380 filed on Apr. 15, 2019 discloses a trigger sprayer made without reliance upon metal or other non-recyclable components (e.g., thermoset resins, elastomers, etc.). While the design described provides a trigger sprayer that may be operable in upright and inverted positions, it lacks any continuous spray functionality. That is, the sprayer will only dispense when it is being actuated.

Thus, a trigger sprayer dispenser made from a single grade of polymeric material with continuous spray functionality would be desirable.

For the sake of clarity and to further highlight and contrast with certain aspects of the invention disclosed herein, all of the aforementioned disclosures are incorporated by reference into this Background section.

SUMMARY OF INVENTION

An all-plastic, continuous trigger sprayer is contemplated that avoids the use of metal parts, elastomers, or other disparate and non-recyclable materials. A reservoir diaphragm is provided within the sprayer head, interposed between the actuation mechanism and the outlet, so as to ensure a steady flow of dispensed fluid is delivered even after actuation has ceased.

Specific reference is made to the appended claims, drawings, and description, all of which disclose elements of the invention. General and preferred aspects are set out in the claims and below. While specific embodiments are identified in the description, it will be understood that elements from one described aspect or embodiment may be combined with those from a separately identified aspect or embodiment. In the same manner, a person of ordinary skill will have the requisite understanding of common processes, components, and methods, and this description is intended to encompass and disclose such common aspects even if they are not expressly identified herein.

In one general aspect the invention provides a continuous-spray trigger dispenser, which can be made without the use of metallic or other non-recyclable parts, in which a reservoir defined by a resiliently-deformable diaphragm is interposed along a fluid flow path between the outlet of a pump chamber and a nozzle outlet of the dispenser itself. The reservoir may be defined between resiliently deformable, faceted shell members whose resilient action may be supplemented with one or more biasing members, preferably of polymer material. Fluid is held within the reservoir volume. One or more valves may be provided to control the ingress of fluid into the reservoir from the pump chamber and/or the egress of fluid from the reservoir to the nozzle outlet. This arrangement enables a volume of fluid, desirably equal to and usually greater than the volume delivered with a single actuation stroke in the pump chamber, to be dispensed as a continuous stream. By continued or repeated actuation, a prolonged continuous dispensing may be available.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure.

In the drawings and attachments, all of which are incorporated as part of this disclosure:

FIG. 2A is a three dimensional perspective view of the exterior of a continuous trigger sprayer according to various aspects of the invention, while

FIG. 5E is an isolated three dimensional perspective view of the nozzle, while

DETAILED DESCRIPTION OF EMBODIMENTS

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Figure 1A:
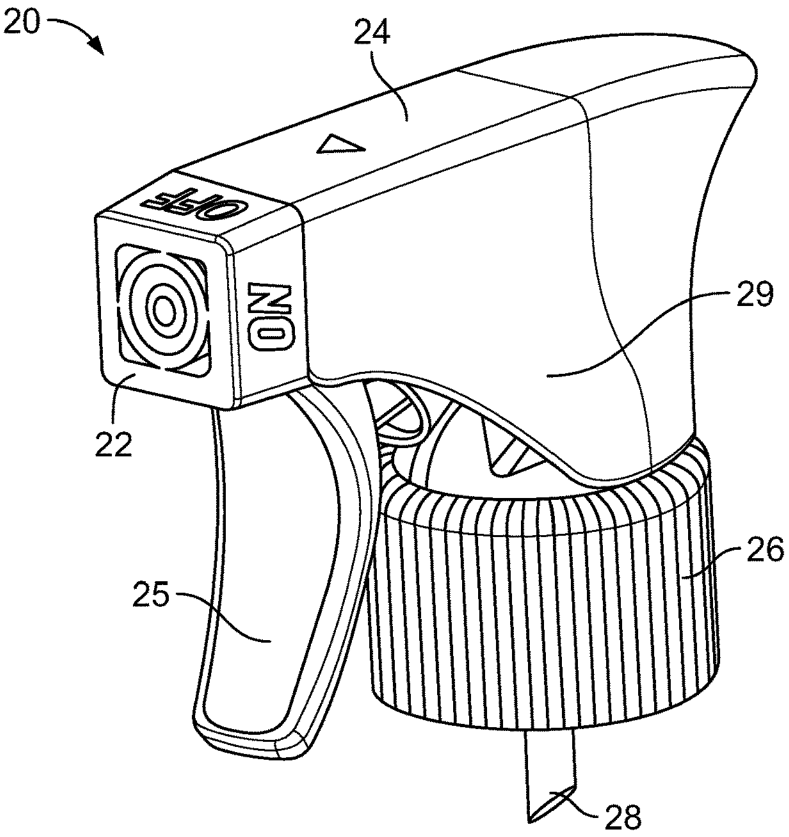
FIG. 1A PRIOR ART
FIG. 1A is a perspective view and FIG. 1B is a cross sectional side view of a conventional trigger sprayer.

FIG. 1A illustrates an exemplary known trigger sprayer design. Spray head 20 includes a horizontally oriented barrel or channel 24 having a nozzle outlet 22 at its distal end. A trigger actuator 25 is positioned proximate to and beneath barrel 24. The trigger 25 is generally orthogonal to the orientation of the barrel 24 and its actuation is in a substantially horizontal direction (when the container is upright). A closure skirt 26 couples to the opening in a container (not shown), while the dip tube 28 extends into the container and draws fluid up into the body 29 and out the dispenser nozzle 22 by way of a pump mechanism (not shown). Notably a plastic shroud may encase the body 29 to create a more streamlined aesthetic. In total, this arrangement ensures that, when used, the fluid is dispensed in a known and predictable path.

Figure 1B:
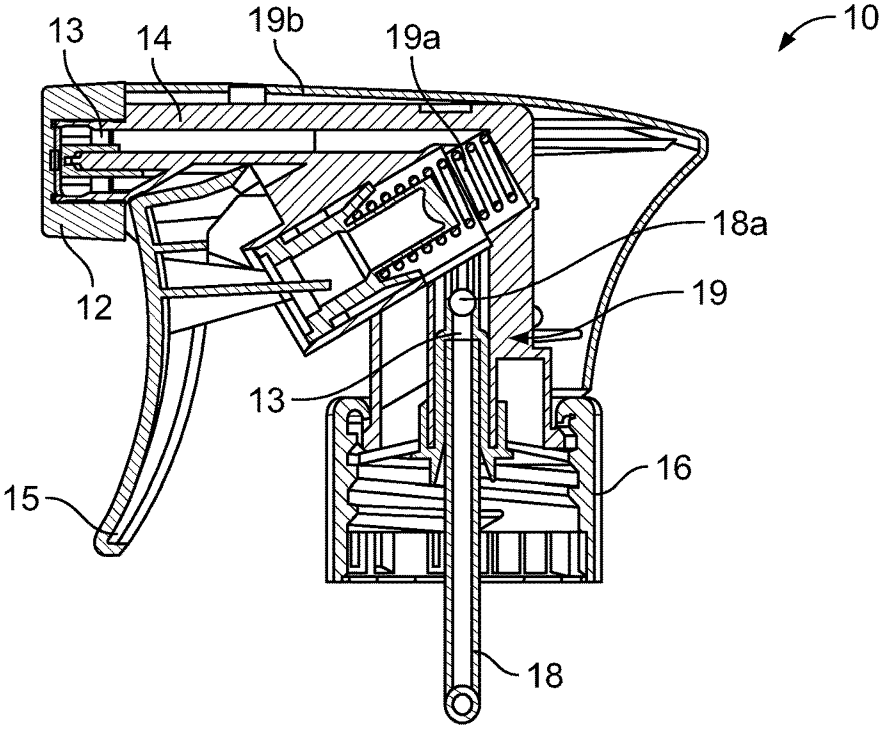
FIG. 1B PRIOR ART
Figure 2A:
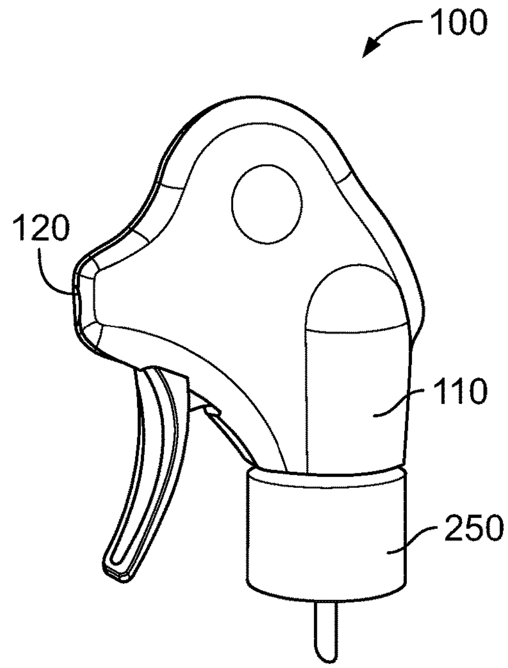
Figure 2B:
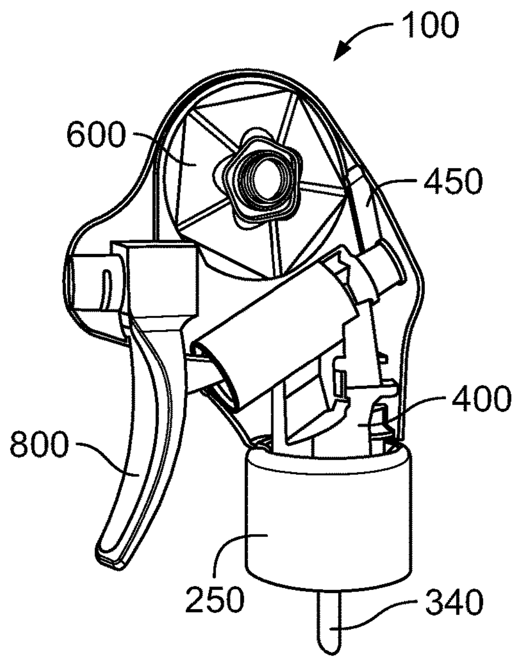
FIG. 2B is a comparable view, but in partial cross section with the shroud piece cut away to reveal certain components.
Figure 2C:
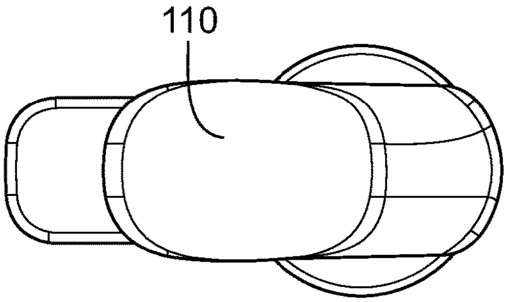
FIGS. 2C and 2D are, respectively, three dimensional top and bottom views of the sprayer contemplated in FIG. 2A.
Figure 2D:
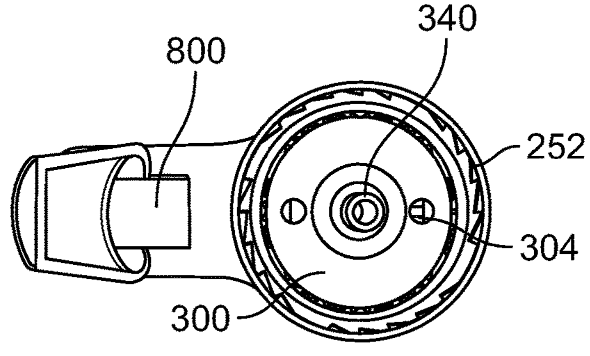
Figure 3A:
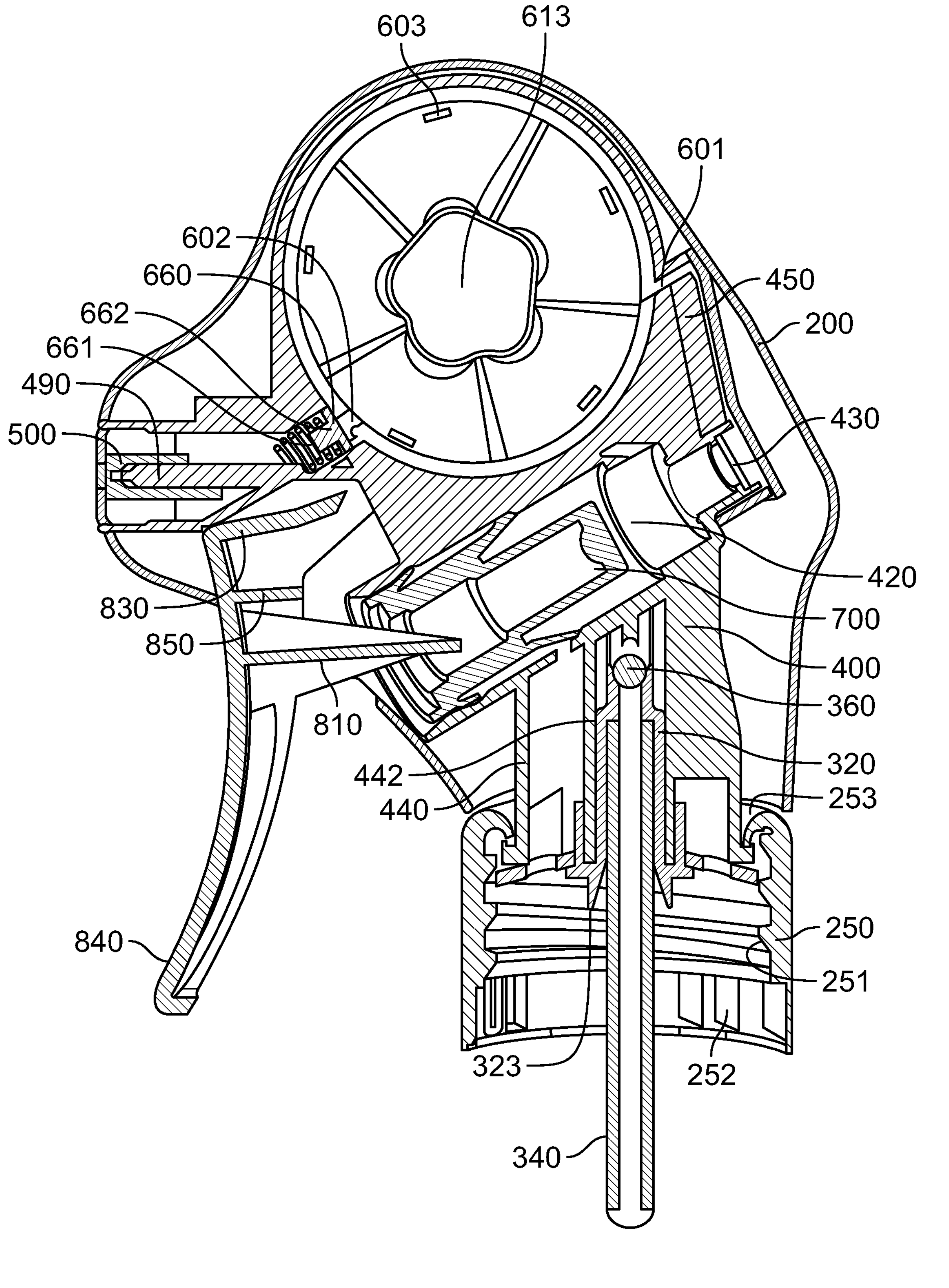
FIG. 3A is a cross sectional side view of the sprayer contemplated in FIG. 2A, with further exploded detailed views as follows.
Figure 3B:
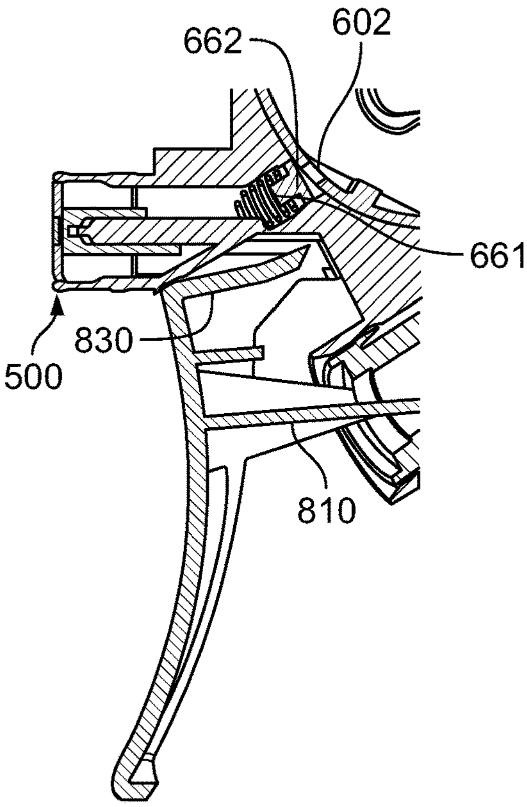
FIG. 3B shows the trigger and nozzle outlet.
Figure 3C:
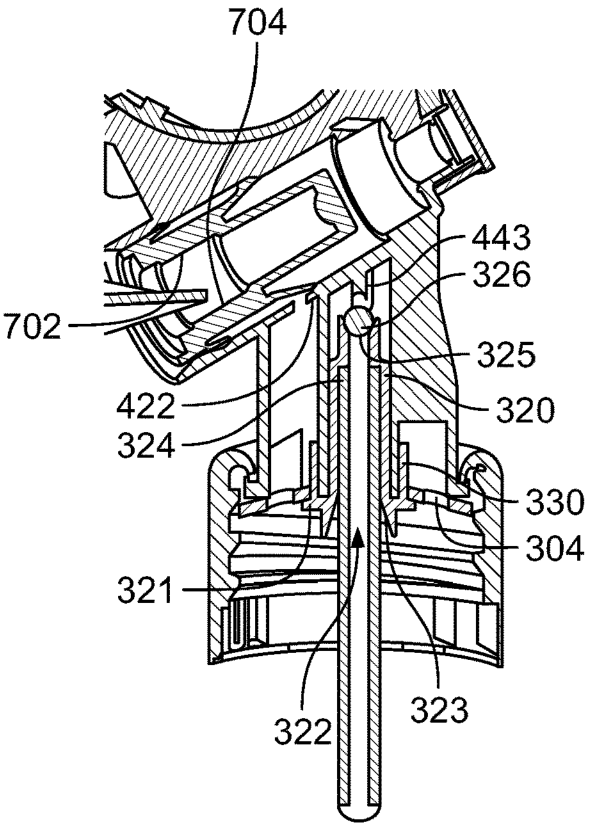
FIG. 3C shows the pump engine.
Figure 3D:
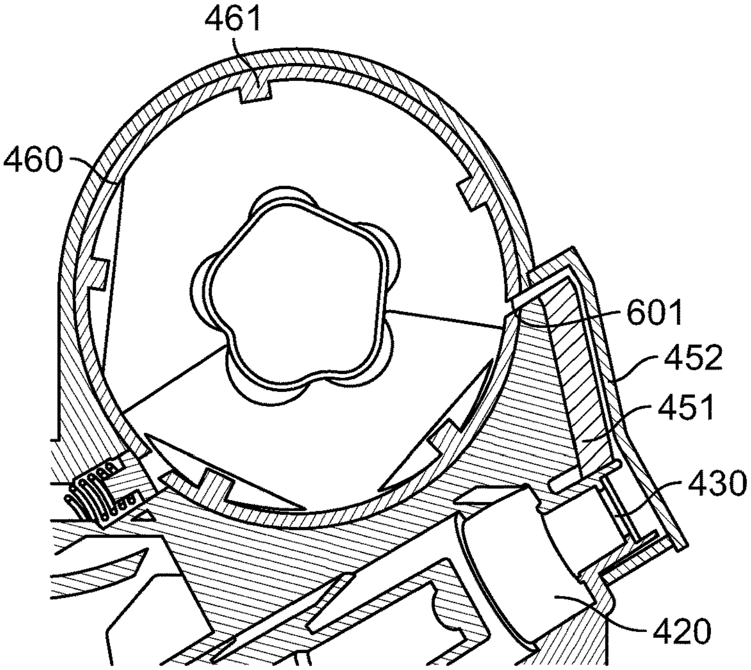
FIG. 3D shows the reservoir diaphragm.
Figure 4:
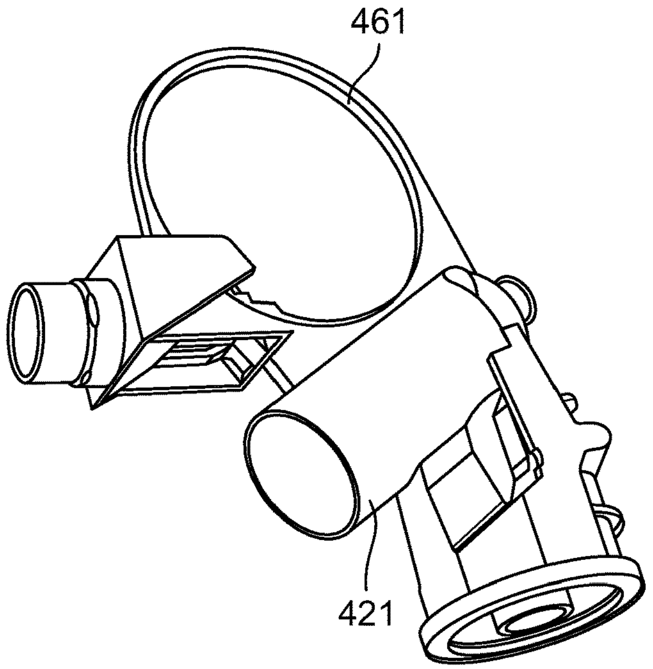
FIG. 4 is a three dimensional perspective view of the pump body in isolation.
Figure 5A:
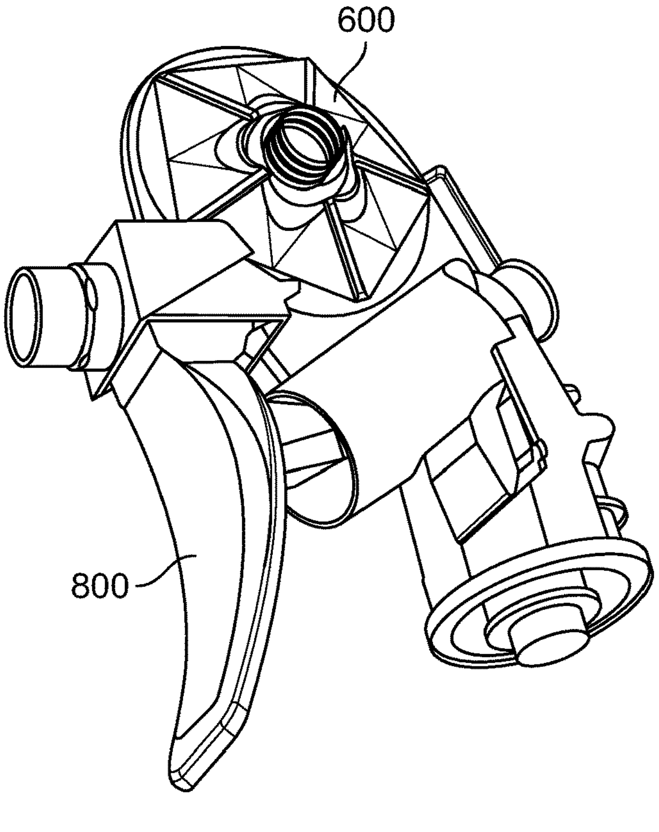
FIG. 5A is a comparable three dimensional perspective view of the pump body of FIG. 4 with the trigger and reservoir diaphragm fitted into place.
Figure 5B:
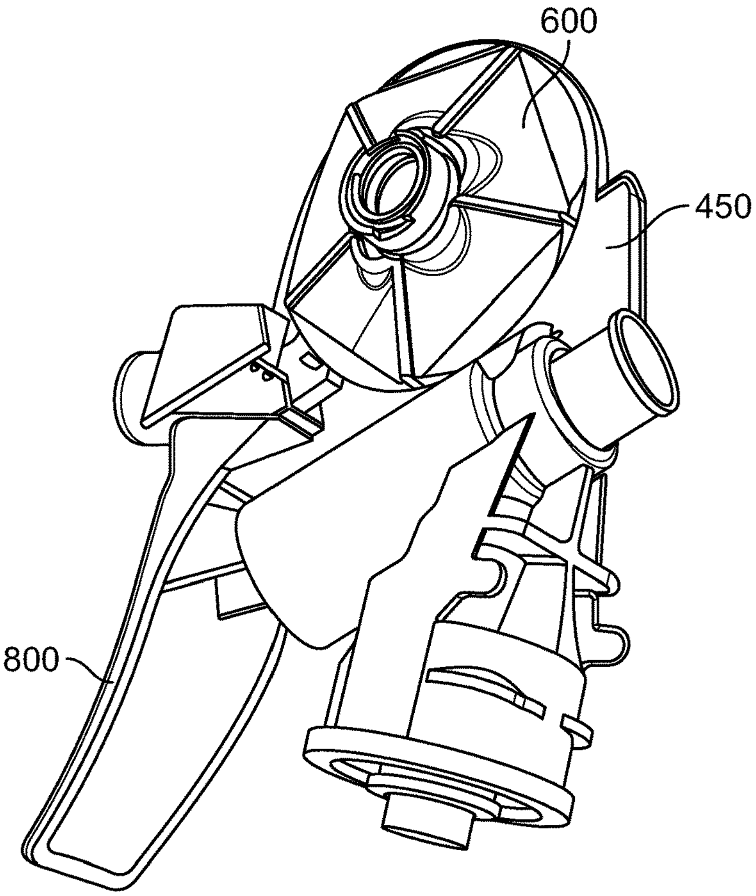
FIG. 5B is a three dimensional perspective view of the components shown in FIG. 5A, but taken from an opposing point of view (FIG. 5A showing a front lower perspective and FIG. 5B showing a back lower perspective).
Figure 5C:
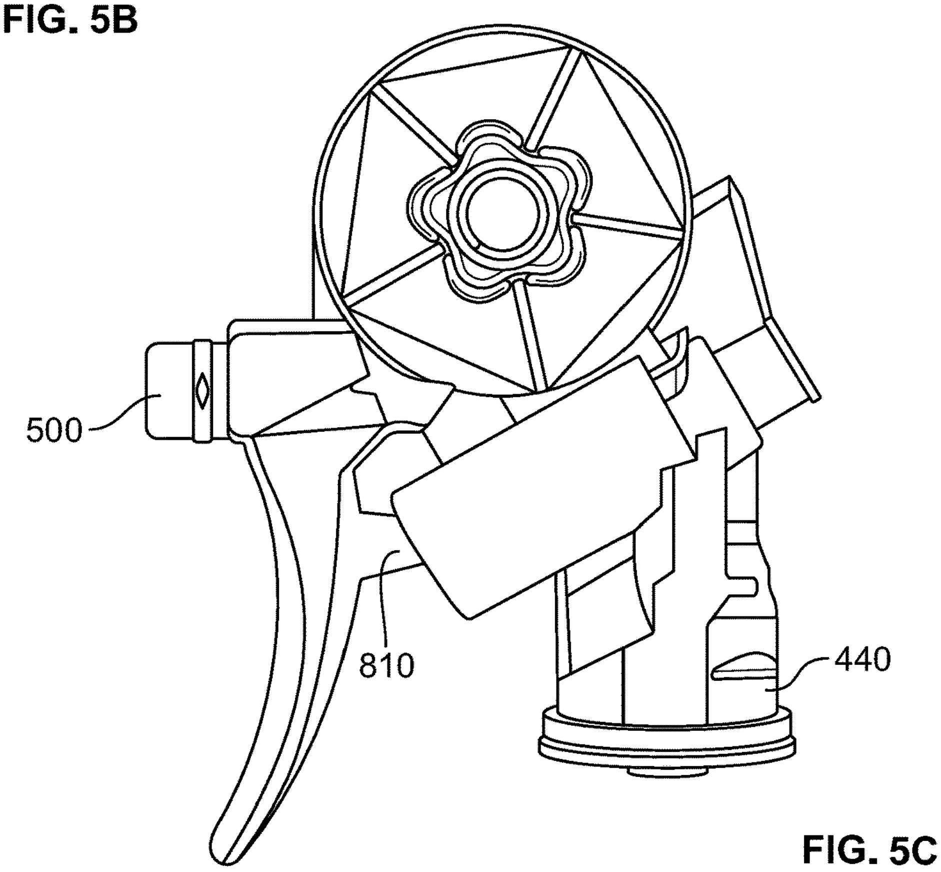
FIG. 5C is a three dimensional perspective side view of the components shown in FIG. 5A.
Figure 5D:
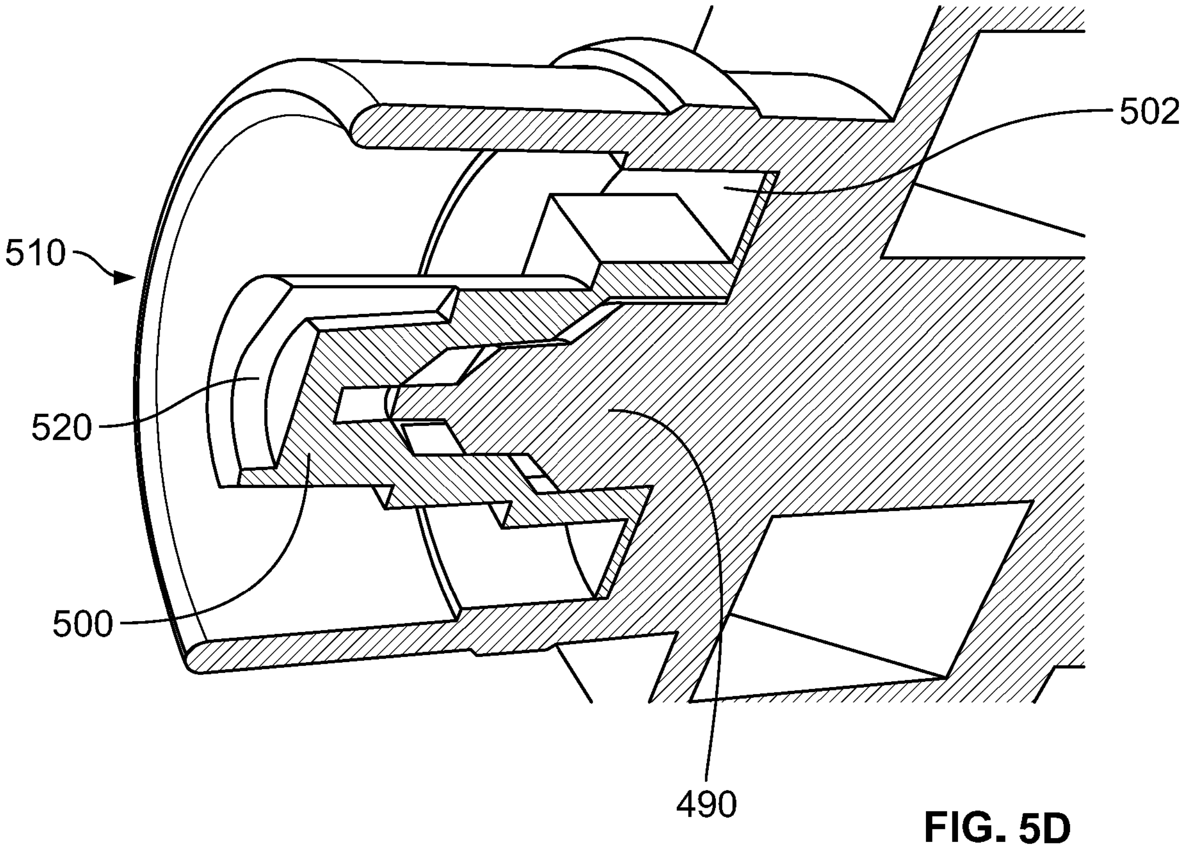
FIG. 5D is a partial, three dimensional cross sectional perspective view of the nozzle outlet seated on the pump body as contemplated in FIG. 5A.
Figure 5E:
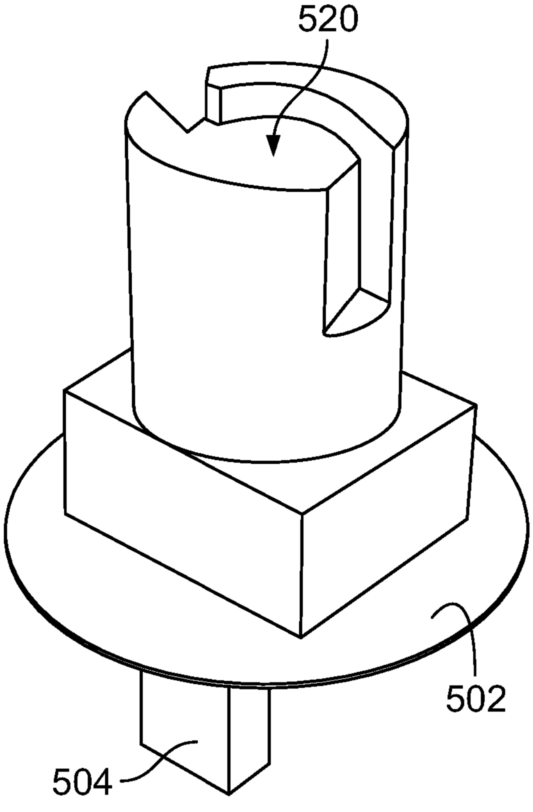
Figure 5F:
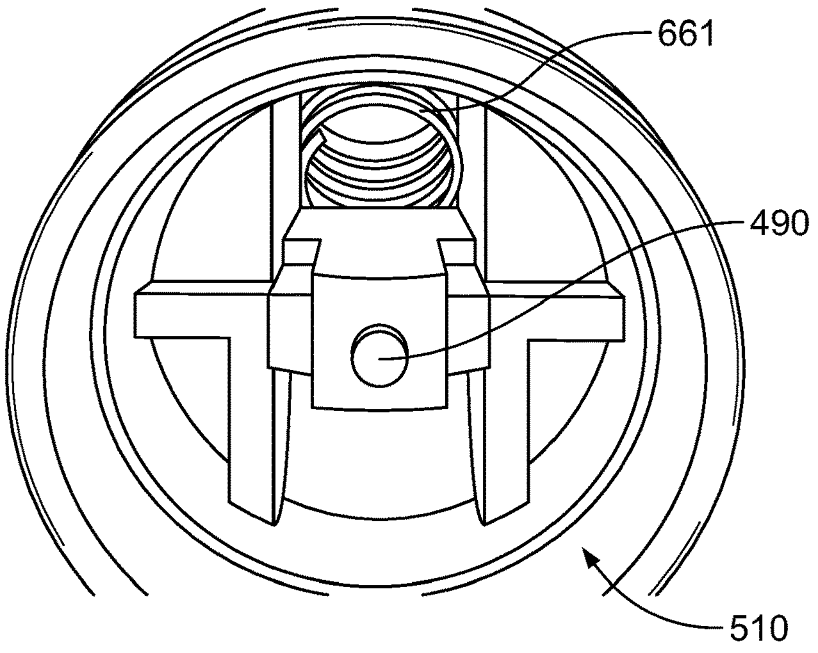
FIG. 5F is an isolated three dimensional sectional view of the pump body highlighting the post onto which the nozzle of FIG. 5E is mounted (with the diaphragm outlet valve biasing member also visible).
Figure 5G:
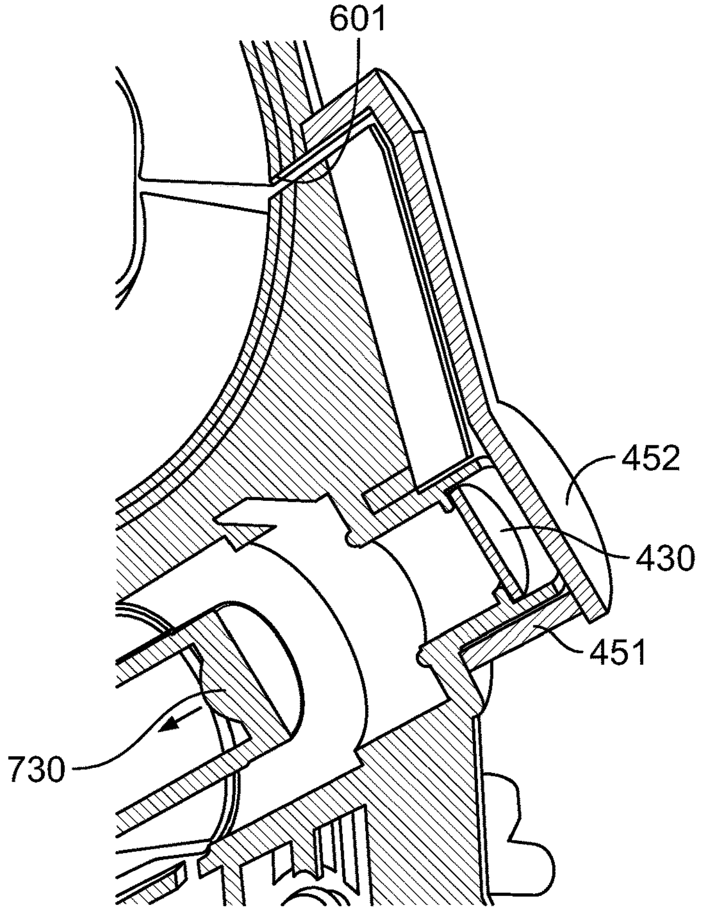
FIG. 5G is a partial, three dimensional cross sectional perspective view of the connector element that delivers fluid from the pump engine to the reservoir diaphragm.
Figure 6B:
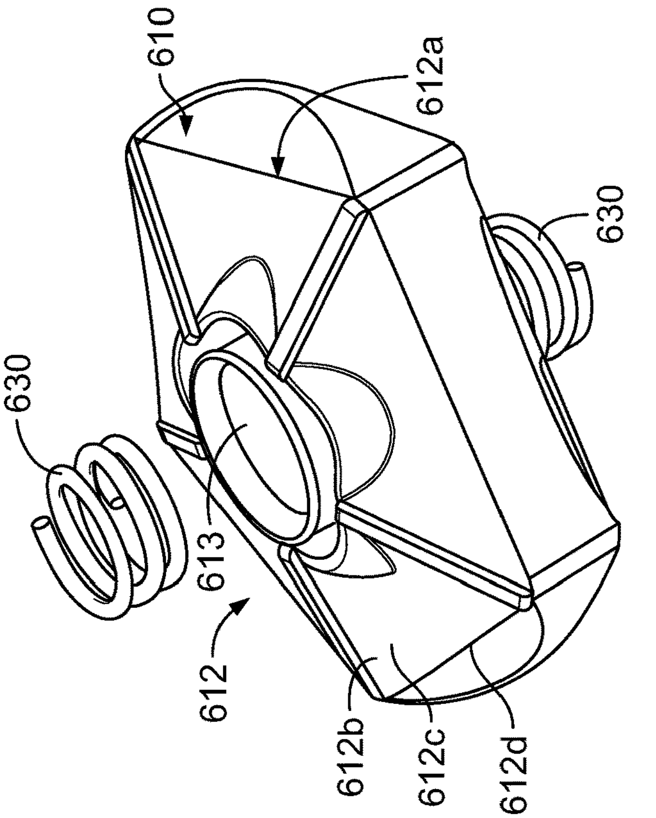
FIGS. 6A and 6B are three dimensional perspective views of the reservoir diaphragm and biasing members, with the latter showing the biasing elements in partially exploded/separated positions relative to the diaphragm.
Figure 6A:
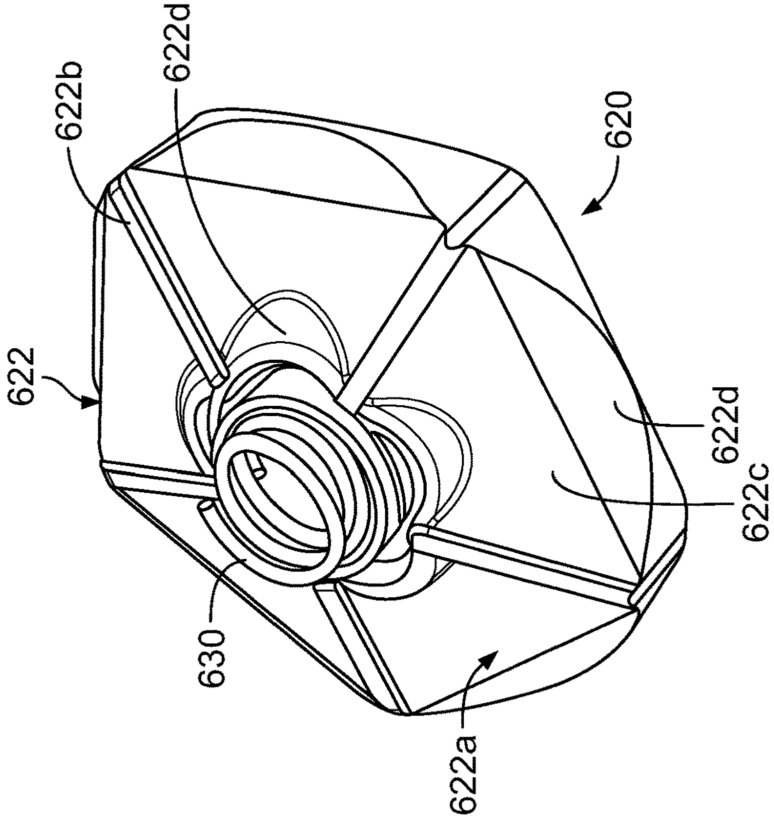
Figure 7:
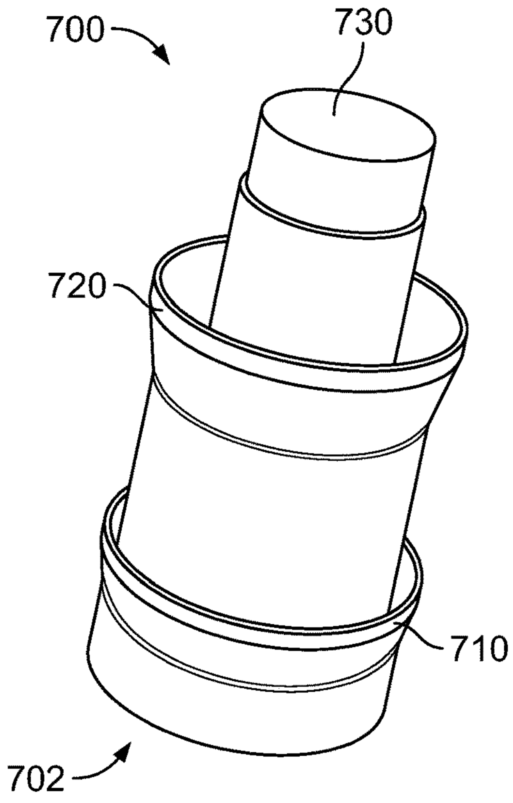
FIG. 7 is a three dimensional perspective view of the piston element shown in isolation.
Figure 8:
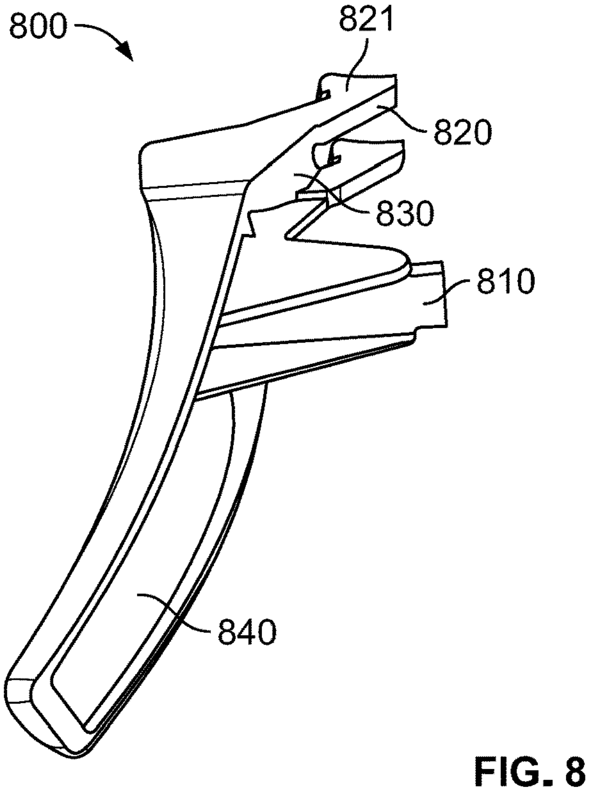
FIG. 8 is a three dimensional perspective view of the trigger element shown in isolation.

FIG. 1B illustrates details of a prior art trigger sprayer which will help to highlight still other distinguishing features of certain aspects of the invention below. Here, prior art trigger sprayer 10 includes a nozzle 12 and barrel 14. Internal flow channel 13 fluidically connects dip tube 18 (which extends into and draws fluid from the container) and the outlet formed in nozzle 12. Therebetween, pump body 19 is actuated by trigger 15. The pump 19 includes a metallic spring 19*a* which creates suction within the channel 13 when the trigger 15 is depressed and released. Glass or metal ball valve 18*a* temporarily seals channel 13 to facilitate dispensing and to avoid unwanted contamination or leakage of fluid from the container. Skirt 16 includes internally facing screw threads that couple to the container neck.

As used herein, trigger sprayers must be distinguished from dispensing pumps, where the fluid flows directly downward owing to the force of gravity. Most dispenser pumps rely on a reciprocating actuator head that is pushed downward (i.e., vertically). The nozzle moves with the head. This arrangement does not include a trigger and, instead, usually requires the actuator to have a flattened head. In contrast, a trigger sprayer includes a movable member positioned proximate and beneath the nozzle (i.e., the dispensing outlet) so as to afford the user a sense of directional dispensing. In fact, most trigger dispensers are designed to atomize or disperse the fluid in a directed stream or spray.

Similarly, continuous spray trigger dispensers must be distinguished from conventional trigger sprayers. In a conventional sprayer, like those shown in FIGS. 1A and 1B, actuation of the trigger immediately draws fluid through the pump body and flow channel out of the nozzle. However, fluid is not dispensed once actuation, such as by pulling the trigger towards the closure, has ceased. In contrast, a continuous sprayer possesses the ability (usually by way of a reservoir) to continue to dispense fluid for an appreciable period of time or dosage (i.e., at least 0.5 seconds and/or so that double the fluid normally drawn by a single stroke of actuation).

FIGS. 2A through 3D show various, exemplary aspects of a continuous trigger sprayer 100 embodying the invention. FIGS. 4 through 8 highlight specific components or combinations of components. Common reference numerals are employed throughout FIGS. 2A through 8. In all instances, it will be understood that modifications and adjustments can be made to these components without departing from the continuous spray functionality and recyclable/single polymeric resin that provides many of the advantageous qualities of the invention.

Trigger sprayer 100 includes an exterior shroud 200, preferably contoured to conceal the reservoir diaphragm 600 along with other portions of the pump engine. A trigger/actuation member 800 is pivotally attached to the pump body 400 and configured for grasping and squeezing actions by the user. The shroud 200 may be snap-fitted to one or more web structures or other attachment points formed on the exterior surfaces of the pump body 400. Shroud 200 will include appropriate apertures and define an appropriately shaped inner void to accommodate the various other structures herein although, with respect to the diaphragm biasing members 630, either the shroud 200 or an extension member of the body 400 (or a combination of the two) can be employed to ensure the appropriate force is consistently applied to the diaphragm 600.

The sprayer 100 is rotatably or selectively attachable to a fluid container (not shown) by way of a closure cap 250. Specifically, threads 251 and optional anti-back off teeth 252 are configured to ensure the cap 250 remains secured to the container. Cap 250 has a hollow tubular shape so as to allow for its attachment to the pump body 400 by way of inward and/or radially extending upper flange 253. A sealing gasket and/or plug-style connectors can be interposed between or positioned proximate to any one or combination of the cap 250, the lower extension stem 440 of the body 400, and the sealing plate 300.

Preferably, shroud 200 is formed as a two or multi-part, snap-together structure such as a clam shell structure as shown. Formations formed along the interface of the shells hold the shroud 200 together along a seam, while engaging features couple to the posts 441 formed on outer facings of the stem 440. In this manner, the head 110 of sprayer 100 presents a familiar, pistol-style dispenser, with a directional dispenser outlet 120 positioned above the trigger 800 when the sprayer 100 is in an upright position.

Annular sealing plate 300 is concentrically received within the cap 250. Plate 300 has a circular shape with a central aperture 302 which is configured to receive and sealingly engage chaplet 320 and/or dip tube 340. Sealing plate 300 also has one or more venting apertures 304 passing through its surface to allow for the flow of make-up air into the container by way a path defined by the interstices and appropriate apertures in the pump chamber 420 and open space between an inner facing of the stem 420 and outer facing of the chaplet 320.

Chaplet 320 has an elongated hollow cylindrical shape that is sized on its outer facings to snap and/or seal tightly to the aperture 302 and, separately by way of bead and groove or other coupling features, within a central channel 442 formed in the stem 440. Along the inner channel 322 defined by the hollow of chaplet 320, dip tube 340 is held by way of similar bead and groove or other snap-fitting features. Annular flange 321 ensures a seal with the plate 300, while a frustoconical funnel 323 can extends downward to simplify insertion of the dip tube 340.

An annular axial flange, extension, or cylinder 330 is spaced apart from the main body of the chaplet 320 to provide for a coupling gap 331. A flange, extension, or full cylinder from the stem 440 fits into gap 331 to couple the chaplet 320 to the body 400.

The upper reaches 324 of the chaplet 320 have an inwardly stepped shape to conform to the dip tube 340. At the upper terminal end, another frustoconical funnel-like formation serves as a seat 325 for check valve 360. As shown, check valve 360 is a plastic ball of sufficient mass/density that gravity naturally urges the valve into a sealed and closed position on the seat 325. When the trigger and pump mechanism creates a temporary vacuum in the flow channel above the seat 325 and valve 360, the valve is temporarily urged upward against retention formations 326 to allow fluid from the container to be drawn into the pump chamber 420.

The central channel 442 formed in the stem 440 is configured to seal and couple to the chaplet 320, but leaving sufficient axial space 443 to accommodate the valve 360. One or more inlets formed in the wall 444 separating the axial space 443 from the pump chamber 420 permits fluid to be drawn into the upper reaches of the pump 400. The sliding movement of the piston 420 within the chamber 420 in response to trigger 800 actuation will draw fluid into the chamber 420 and urge previously primed fluid into the diaphragm reservoir 600. In that same motion, make-up air also passes through air inlet 422, down through vents 304 and into the internal volume of the container, so as to avoid negative pressure differentials that can lead to deformation of the container.

Pump body 400 includes a hollow cylinder portion 421 that, in conjunction with the piston 700, defines a variable volume pump chamber 420 that lies within the fluid flow path/receives fluid from the container. Chamber 420 is fluidically connected to the channel 442 to define a dispensing fluid flow channel running from the container, through the chaplet 320, sequentially into the chamber and then the reservoir diaphragm 600, and finally out of the nozzle outlet 500. The maximum volume of fluid received within the pump chamber is less than the volume of fluid capable of being stored within the reservoir diaphragm.

A sliding piston 700 is received within the cylinder 421. Piston 700 connects to and/or cooperates with driving post 810 of the trigger 800, while coupling flanges 820, including snap-fit overhangs 821, attach the trigger 800 to the body 400. A resilient wedge 830 flexibly contacts the body 400 and urges the actuation lever 840 of trigger 800 away from the chamber 420 and piston 700, while a stopper 850 cooperates with a corresponding stopper on the body 400 to define the innermost extent to which the trigger 800 may be depressed. Post 810 may be coupled to the piston 700 to ensure the piston 700 is returned to its starting position (pre-actuation) after the trigger is depressed.

In alternative arrangements, one or more plastics biasing members could be positioned proximate to the trigger 800 and/or piston 700 to facilitate the necessary movements associated with actuation, including returning the piston to its starting position. Such biasing members could be positioned between the actuation lever 840 and the body 400 or piston 700 and/or within the pump chamber 420 itself. Other locations are also possible. In each instance, the goal is to permit the trigger 800 sufficient movement to urge the piston 700 in a pumping stroke (i.e., so that fluid is drawn into and expelled from chamber 420) but then return the trigger 800 and piston 700 to a resting position in a relatively smooth and automatic fashion so as to enable additional actuating strokes.

Piston 700 has a cup-like shape, with the open end receiving the post 810 on the inner surface 702. A catch 704 may be provided to ensure proper engagement so that the trigger 800 moves in concert with the piston 700. A first flared outer surface or wing 710 forms a sliding seal at the lower-most regions of chamber 420/cylinder 421. An upper flared surface or wing 720 also conforms the cylinder 421 to form a separate sliding seal, with the wing 720 axially offset above wing 710. Wing 720 blocks leakage and unwanted egress of fluid out of chamber 420, while wing 710 controls ingress of air into chamber 420. Further, the movement of piston 700 along the axis of cylinder 421 creates sufficient suction to move fluid through the body 400, thereby driving the pump mechanism.

The terminal edge of wing 710 and/or 720 may serve as a stopper that prevent further axial movement of the piston 700 within the cylinder 421. This can also serve as a further safeguard, in conjunction with stopper 450 to prevent the trigger 800 from being actuated or operated in a manner that misaligns or damages the various moving parts.

Solid top panel 730 of piston 700 drives fluid that was drawn into the chamber 420 through an outlet 423. Outlet is seal by a disc or flap valve 430 seated over the outlet 423. Valve 430 may provide pre-compression functionality but, at a minimum controls flow of fluid into the diaphragm reservoir 600. Valve 430 may be a simple flap or floating disc, with both gravity and pressure from fluid stored above the chamber 420 (i.e., in reservoir 600) helping to keep the valve 430 properly seated.

Flow connector element 450 fits and bridges the space between the chamber 420 and reservoir 600. Element 450 may include an elongated C-shaped, channel-defining portion 451 with a snap-fitting cover 452. Between portions 451 and 452, a channel 453 redirects fluid passing through an annular aperture and toward the inlet 601 of reservoir 600. Alternatively, element 450 could be integrally molded into the main body 400, although use of cover 452 simplifies assembly of the valve 430.

A retaining ring or feature 460 is formed in the upper reaches of body 400. Feature 460 is configured to secure the diaphragm reservoir 600 in place at attachment points 603. Ring or extension strip 461 may include coupling features that cooperate with similar features formed on the inner or outer surface of the annular walls 611, 621 of diaphragm shell members 610, 620. While shown as a single, vertically oriented hoop, strip 461 could be formed as a web or plurality of members shaped to receive the diaphragm 600 in any orientation, so long as its inlet 601 and outlet 602 are properly aligned with the flow channel defined by body 400 and described elsewhere herein. In some aspects, the extension 461 could be shaped to also accommodate the diaphragm biasing members 630.

Reservoir diaphragm 600 is interposed along the fluid flow path between the outlet 423 of the pump chamber 420 and the nozzle outlet 500 of the sprayer itself. In cooperation with resilient, deformable, faceted shell members 610, 620 and biasing members 630, fluid is held within the volume defined by the shell members 610, 620, with valve 430 and diaphragm outlet valve 660 controlling the ingress and egress of fluids. This arrangement ensures that a volume of fluid, equal to or greater than the volume delivered with a single actuation stroke, may be dispensed as a continuous stream. Further, by continued actuation during dispensing, it is possible to continuously dispense fluid from the sprayer 100 for significantly longer periods of time than is otherwise possible by repeated actuation of a conventional trigger sprayer alone.

In some aspects, the volume of fluid held in the reservoir 600 is at least 1, 1.5, 2.0, 2.5, 3, 4, 5 and even up to 10, 15, or 20 times or times larger than the volume of fluid delivered by a single actuation stroke of trigger 800 and piston 700 (i.e., the maximum volume of fluid received in the pumping chamber 420 from the container). Additionally or alternatively, this arrangement enables sprayer 100 to deliver a continuous and uninterrupted stream or atomized spray of fluid for at least 0.5, 1, 2, 3, 4, 5, and even up 10 or 15 seconds after actuation has ceased. In some aspects, it may be possible for the user to recharge the reservoir 600 through renewed actuation (i.e., after an interim between the initial dispensing stroke) so as to sustain even longer continuous spray times, possibly even sustaining continuous spraying action until the container is emptied.

The structure of diaphragm 600 includes two separate shells 610, 620 of similar shape, size, and construction. Each includes a cylindrical sidewall 611, 622 which include coupling features to attach to the body 400 (via feature 460 or, more specifically, extension ring 461) and/or to one another. The sidewalls 611, 622 should be of sufficient strength and thickness to withstand deformation of their respective top panels 612, 622 without buckling, decoupling, or otherwise comprising the flow path and function of the sprayer 100. One or more cooperating radial fins, teeth, indents/detents, or other formations may be provided on the inner and/or outer facings of the sidewalls 611, 622 to lock each shell in place, as well as interfacing with the feature 460 to prevent rotation or movement of the diaphragm 600 relative to the body 400.

Inlet 601 and outlet 602 are provided in one or both of the sidewalls 611, 622. The port for each can be formed at their junction by way of an appropriate cutout or aperture. The positioning of the inlet 601 and 602 will be spaced apart sufficiently to ensure each connects to the remaining flow path (i.e., inlet 601 fluidically attaches to the connector 450 and the outlet to the nozzle 500). In one aspect, the inlet 601 and outlet 602 can be positioned apart around the circumference of the diaphragm at an angle greater than 90° and less than 180°, although other arrangements and/or multiple ports all connecting to the final flow path could be provided. A flap or check valve could be provided proximate to inlet 601 to act as a further safeguard against unwanted leakage from the reservoir 600.

The entirety of diaphragm 600 should be positioned axially above the entirety of the pump chamber 420. Further, the inlet 601 should be elevated in comparison to the position/axial height of the outlet 602. Positioning of these elements ensures that fluid preferentially flows out of the diaphragm 600 and into the nozzle 500. In aspects of the invention, after filling by way of one or repeated actuation strokes, the diaphragm 600 will drain completely or at least to a level below the inlet 601

A seat 613, 623 is provided in the top panel 612, 622. These seats 613, 623 engage separate biasing members 630 which exert squeezing force on the diaphragm 600. Separately, multiple facets 612*a*, 622*a* are formed in the top panels 612, 622 to provide resilient deformability to the diaphragm 600. In this manner, fluid entering the reservoir 600 can accumulate by expanding the diaphragm 600 outward in conformance with facets 612*a*, 622*a*. When sufficient expansion has occurred, biasing members 630 provide squeezing force to expel the fluid through the outlet 602, while overcoming whatever force might be exerted by diaphragm outlet valve 660. Dispensing will continue in this manner until the diaphragm 600 and the fluid held within it return to its original condition of stasis.

Notably, the facets 612*a*, 622*a* may be imparted with either outward or inward biasing, depending upon the desired volume of fluid to be held in the reservoir 600 and the continuous dispensing characteristics to be maintained. Thus, each facet has a gently sloped planar surface relative to the plane defined by the terminal edge of the annular sidewall 611, 621 (or, in the alternative, by the plane that is orthogonal to the flattened surfaces of seats 613, 623. This arrangement imparts a concave or convex, pyramidal shape to each top panel 612, 622, with both panels preferably (but not necessarily) being concave or convex. The sidewalls 611, 621 serve as an annular support as the facets 612*a*, 622*a* are flexed and stressed.

Support ribs 612*b*, 622*b* connect between the sidewall 611, 621 and seats 613, 623 to facilitate the resiliency and strength of the diaphragm 600. Additional indents and features may be formed in the walls 611, 621 and/or top panels 612, 622 further enhance these traits. Ribs 612*b*, 622*b* also define the individual facets 612*a*, 622*a*, so that having 5 ribs yields 5 facets, etc., which is a preferred aspect. Nevertheless, while 5 ribs and facets are shown here, it will be understood that any number is possible, with the precise number impacting the resilience and strength of the resultant diaphragm 600, as well as its ability to accommodate fluctuating fluid pressures within it. Any whole number from 3 to 12 facets and ribs should have particular utility in accomplishing the goals of the invention.

Each facet 612*a*, 622*a* may include a flattened portion 612*c*, 622*c* and a scalloped or cylindrical formation 612*d*, 622*d* at its top and/or bottom edge boundaries (i.e., where the flat portion 612*c*, 622*c*, joins and connects to the seat 613, 623 and the sidewall 611, 621, respectively speaking). These formations 612*d*, 622*d* can be curving so that when force is exerted on the seats 613, 623, the formations 612*d*, 622*d* deform and bend within that defined surface.

Springs 630 (along with the other biasing members identified herein) can be plastic coils, leaf springs, or other similar structures. The amount of force exerted by springs 630 cooperates with the concave or convex shape of diaphragm 600 to ensure fluid is admitted and expelled in a regular manner that is initially responsive to actuation of the trigger 800.

Diaphragm outlet valve 660 can be formed with a biasing member 661. The force exerted by the biasing member 661 should be less than the force exerted by the biasing members 630 when the reservoir 600 is sufficiently expanded. In this manner, it ensure continuous flow through the outlet 602 and out of the nozzle 500. Biasing member 661 urges a flap or blocking member 662 into position to seal the diaphragm reservoir 660 and retain fluid inside it. A tubular connector can be included in the valve 660 or a tubular extension can be integrally formed in one or both of the shells 610, 620, in either case the tubular member would ensure a proper seal is maintained while simultaneously accommodating any movement of the diaphragm 600 as it expands and contracts.

In the body 400 proximate to where the outlet 602 is seated, a channel is formed to continue the fluid flowpath out of the diaphragm 600 and toward the outlet 510 of nozzle 500. To that end, a post 490 may be formed to coincide with the axial flowpath. Nozzle 500 attaches to post 490, with appropriate channels and apertures provided in the post 490 and the nozzle 500 to route fluid swirl chamber 520 and out of outlet 510. Nozzle 500 may include a circular shutter or blocking element 502 to direct part or all of the fluid flow through channels and apertures imparted in the nozzle into the swirl chamber 520, while attachment post 504 facilitates coupling of the nozzle 500 to the post 490.

Notably, this arrangement of diaphragm 600 can also act as serve a pre-compression functionality, so that it is possible to dispense fluid upon the first actuation stroke. However, pre-compression is not required, and trigger sprayer 100 can be designed, with careful selection of the valves 430, 660 and biasing members 630, 661 (if present) informing the exact dispensing characteristics.

In some aspects, a manual valve can supplement or replace valve 660. This manual valve could be as simple as a slidable member extending from the trigger into the flowpath proximate the nozzle 500 so as to block the flowpath. When slid downward, the reservoir 600 would dispense fluid until it is drained completely or until the user closes the slidable valve. Alternative arrangements could rely on a sideways movement of the entire trigger 800 (rather than a slidable member being inlaid or proximate to the actuation lever 840) to open and block the flowpath. Other control arrangements are possible as well.

United States' patent publication number US2018/0318861A, filed on Apr. 25, 2018 discloses a polymeric diaphragm body. This body is coupled to a closure and, through appropriate inlets and outlets, suctions fluid from a container and expels it through the opening. Aspects of the construction and operation of such a diaphragm are applicable to the reservoir diaphragm contemplated herein. Other examples of appropriate bellows and other expandable structures that may serve as reservoirs, as well as biasing and alternative pump engines and actuation schemes, can be found in U.S. Pat. Nos. 5,924,603; 6,193,112; 6,672,486; and 6,715,649, as well as in United States Patent Publication 2017/0216864. All of these documents are incorporated by reference herein.

While the bellows are shown in a vertical, fin-like arrangement, it may be possible to provide a bellows horizontally so to impart a hammer-head shape to the dispenser. In this arrangement, the diaphragm 600 is still interposed between the connector 350 and nozzle 500, but the formation 460 lies in a horizontal rather than vertical plane (with each plane defined relative to the sprayer 100 in its upright, resting position). It may also be possible to provide a plurality of diaphragms of similar or differing constructions, with attendant alteration of the dispensing characteristics of the resulting sprayer. Still further modifications of this nature are possible without departing from the principles of invention.

In view of the foregoing, aspects of the continuous spray, trigger actuated dispenser expressly contemplated herein include any combination of the following elements:

a pump body defining a fluid flow path passing completely through the pump body, the pump body having a closure cap, a dispensing nozzle, and a pump chamber accommodating a movable piston; a reservoir diaphragm attached to the pump body and positioned above the pump chamber, the reservoir diaphragm having an inlet receiving fluid from the pump chamber, an outlet connected to the dispensing nozzle, and a sidewall connected to at least one expandable, resilient panel that moves in response to fluid accumulation within the diaphragm and biasing force exerted on an outer surface of the panel; and a trigger pivotally connected to the pump body proximate to the pump chamber, the trigger having a driving member urging the piston to move within the pump chamber, thereby varying volume in a portion of the pump chamber connected to the fluid flow path so as to urge fluid along the fluid flow path; wherein fluid accumulating within the diaphragm is dispensed continuously according to at least one of the following: (i) for a period of time exceeding that required to actuate the trigger; and/or (ii) so that a maximum volume of fluid received within the portion of the pump chamber connected to the fluid flow path is less than a volume of the reservoir diaphragm when the panel is at least partially expanded;

wherein the closure cap includes a chaplet with a check valve interposed in the fluid flow path between the chaplet and the pump chamber;

wherein the chaplet and the pump chamber each include make-up air inlets and wherein a sealing wing member attached to the piston allows make-up air to pass through the inlets when the piston is moved as the trigger is actuated;

wherein the diaphragm comprises two shell members coupled together with at least one shell member including the panel;

wherein the panel includes a plurality of facets separated by reinforcing ribs with the plurality of facets forming a concave or convex pyramid;

wherein each facet includes a flattened portion defining the concave or convex pyramid and one or two cylindrical formations proximate to top and/or bottom edges of the flattened portion;

wherein each shell member is identical;

wherein each shell member includes a cylindrical sidewall so that the inlet and outlet pass through the sidewalls;

wherein the diaphragm includes a cylindrical sidewall so that the inlet and outlet pass; through the sidewall.

wherein a plastic biasing member compresses the panel;

wherein the dispensing nozzle is mounted on a post formed within the fluid flow path;

wherein the dispensing nozzle and posts form discrete flow channels terminating in a swirl chamber immediately proximate to an outlet of the dispensing nozzle;

wherein the reservoir diaphragm is coupled to the pump body by an extension formed in the pump body;

wherein a connector defines the fluid path between the pump chamber and the reservoir diaphragm, the connector enclosing a valve;

wherein the pump body, the trigger actuator, and the closure are made from the same grade of polymeric material; and wherein the polymeric material consists of polypropylene.

References to coupling, connection, or attachment in this disclosure are to be understood as encompassing any of the conventional means used in this field. This may take the form of snap- or force-fitting of components having tabs, grooves, and the like. Nevertheless, threaded connections, annular or partial bead-and-groove arrangements, cooperating cam members, and slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

All components should be made of materials having sufficient flexibility and structural integrity, as well as a chemically inert nature. The materials should also be selected for workability, cost, and weight. Common polymers amenable to injection molding, extrusion, or other common forming processes are useful, although a single grade is preferred. As such, polypropylene is expected to have particular utility for every component described in FIGS. 2A through 8.

In fact, a key reason consumers, manufacturers, and others will find utility in these designs/components is precisely because of the use of only a single grade of polymer (e.g., polypropylene) that should greatly simplify recycling of the inventive trigger sprayer. Other materials and particularly recyclable, injection molding materials may be useful, including without limitation polyethylene (including low density and other grades), polystyrene (including high impact and other grades), acrylonitrile butadiene styrene, and polyacetals (including polyoxymethylene, polyacetal, polyformaldehyde, and other grades).

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

The invention claimed is:

1. A continuous spraying trigger dispenser having no metallic components, the dispenser comprising:

a pump body defining a fluid flow path passing completely through the pump body, the pump body having a closure cap, a dispensing nozzle, and a pump chamber accommodating a movable piston;

a reservoir diaphragm attached to the pump body and positioned above the pump chamber, the reservoir diaphragm having an inlet to receive fluid from the pump chamber, an outlet connected to the dispensing nozzle, and a sidewall connected to at least one expandable, resilient panel that moves in response to fluid accumulation within the reservoir diaphragm and biasing force exerted by a plastic biasing member on an outer surface of the resilient panel so as to compress the resilient panel; and a trigger pivotally connected to the pump body proximate to the pump chamber, the trigger having a driving member urging the piston to move within the pump chamber, thereby varying volume in a portion of the pump chamber connected to the fluid flow path so as to urge fluid along the fluid flow path;

whereby fluid accumulating within the reservoir diaphragm is dispensable continuously according to at least one of the following: (i) for a period of time exceeding that required to actuate the trigger; and (ii)

so that a maximum volume of fluid received within the portion of the pump chamber connected to the fluid flow path is less than a volume of the reservoir diaphragm when the resilient panel is at least partially expanded.

2. The dispenser of claim 1 wherein the closure cap includes a chaplet with a check valve interposed in the fluid flow path between the chaplet and the pump chamber.

3. The dispenser of claim 2 wherein the chaplet and the pump chamber each include make-up air inlets and wherein a sealing wing member attached to the piston allows make-up air to pass through the make-up air inlets when the piston is moved as the trigger is actuated.

4. A continuous spraying trigger dispenser having no metallic components, the dispenser comprising:

a pump body defining a fluid flow path passing completely through the pump body, the pump body having a closure cap, a dispensing nozzle, and a pump chamber accommodating a movable piston;

a reservoir diaphragm attached to the pump body and positioned above the pump chamber, the reservoir diaphragm having an inlet to receive fluid from the pump chamber, an outlet connected to the dispensing nozzle, and a sidewall connected to at least one expandable, resilient panel that moves in response to fluid accumulation within the reservoir diaphragm and biasing force exerted on an outer surface of the resilient panel; and a trigger pivotally connected to the pump body proximate to the pump chamber, the trigger having a driving member urging the piston to move within the pump chamber, thereby varying volume in a portion of the pump chamber connected to the fluid flow path so as to urge fluid along the fluid flow path;

whereby fluid accumulating within the reservoir diaphragm is dispensable continuously according to at least one of the following: (i) for a period of time exceeding that required to actuate the trigger; and (ii) so that a maximum volume of fluid received within the portion of the pump chamber connected to the fluid flow path is less than a volume of the reservoir diaphragm when the resilient panel is at least partially expanded; and wherein the reservoir diaphragm comprises two shell members coupled together, with at least one shell member including a said expandable resilient panel.

5. The dispenser of claim 4 wherein the resilient panel includes a plurality of facets separated by reinforcing ribs with the plurality of facets forming a concave or convex pyramid.

6. The dispenser of claim 5 wherein each facet includes a flattened portion defining the concave or convex pyramid and one or two cylindrical formations proximate to top and/or bottom edges of the flattened portion.

7. The dispenser of claim 4 wherein each shell member is identical.

8. The dispenser of claim 4 wherein each shell member includes a cylindrical sidewall and the inlet and outlet pass through the sidewalls.

9. The dispenser of claim 1 wherein the reservoir diaphragm includes a cylindrical sidewall so that the inlet and outlet pass through the sidewall.

10. The dispenser of claim 1 wherein the dispensing nozzle is mounted on a post formed within the fluid flow path.

11. The dispenser of claim 10 wherein the dispensing nozzle and post form discrete flow channels terminating in a swirl chamber immediately proximate to an outlet of the dispensing nozzle.

12. The dispenser of preceding claim 1 wherein the reservoir diaphragm is coupled to the pump body by an extension formed in the pump body.

13. The dispenser of claim 1 wherein a connector defines the fluid path between the pump chamber and the reservoir diaphragm, the connector enclosing a valve.

14. The dispenser of claim 1 wherein the pump body, the trigger, and the closure cap are made from the same grade of polymeric material comprising polypropylene.

15. The dispenser of claim 4 wherein the pump body, the trigger, and the closure cap are made from the same grade of polymeric material comprising polypropylene.

16. The dispenser of preceding claim 4 wherein the reservoir diaphragm is coupled to the pump body by an extension formed in the pump body.

17. The dispenser of claim 4 wherein a connector defines the fluid path between the pump chamber and the reservoir diaphragm, the connector enclosing a valve.

18. The dispenser of claim 4 wherein the dispensing nozzle is mounted on a post formed within the fluid flow path.

19. The dispenser of claim 18 wherein the dispensing nozzle and post form discrete flow channels terminating in a swirl chamber immediately proximate to an outlet of the dispensing nozzle.

* * * * *